(12) United States Patent
Martin et al.

(10) Patent No.: US 8,322,902 B2
(45) Date of Patent: Dec. 4, 2012

(54) OPTICAL SYSTEM WITH MAIN FUNCTION FOR MOTOR VEHICLE

(75) Inventors: Laure Martin, Sens (FR); Benjamin Vernisse, Veron (FR); Benjamin Thierry, Palis (FR); Nicolas Vathonne, Les Sieges (FR); Jean-Claude Gasquet, Saint Clement (FR)

(73) Assignee: Valeo Vision, Bobigny (FR)

( * ) Notice: Subject to any disclaimer, the term of this patent is extended or adjusted under 35 U.S.C. 154(b) by 707 days.

(21) Appl. No.: 12/394,529

(22) Filed: Feb. 27, 2009

(65) Prior Publication Data

US 2009/0219731 A1 Sep. 3, 2009

(30) Foreign Application Priority Data

Mar. 3, 2008 (FR) ..................................... 08 01168

(51) Int. Cl.
*F21V 9/00* (2006.01)
(52) U.S. Cl. ......... 362/511; 362/541; 362/540; 362/498
(58) Field of Classification Search .......... 362/611–613, 362/540, 509–511, 311.01, 311.02, 337–340, 362/489, 495–497
See application file for complete search history.

(56) References Cited

U.S. PATENT DOCUMENTS

| | | | |
|---|---|---|---|
| 4,460,939 A * | 7/1984 | Murakami et al. | 362/609 |
| 5,921,652 A * | 7/1999 | Parker et al. | 362/601 |
| 6,752,522 B2 | 6/2004 | Pinson et al. | |
| 6,784,603 B2 | 8/2004 | Pelka et al. | |
| 6,814,479 B2 | 11/2004 | Aynie et al. | |
| 2002/0093829 A1 | 7/2002 | Pinson | |
| 2003/0063473 A1 | 4/2003 | Aynie et al. | |
| 2003/0085642 A1 | 5/2003 | Pelka et al. | |
| 2003/0147253 A1 * | 8/2003 | Shy | 362/545 |
| 2004/0130912 A1 * | 7/2004 | Miyashita | 362/561 |
| 2006/0245210 A1 * | 11/2006 | Lin et al. | 362/612 |
| 2007/0247862 A1 * | 10/2007 | Tanghe et al. | 362/498 |
| 2008/0013333 A1 * | 1/2008 | Koizumi et al. | 362/511 |
| 2008/0019139 A1 | 1/2008 | Dubosc et al. | |
| 2010/0246200 A1 * | 9/2010 | Tessnow et al. | 362/509 |

FOREIGN PATENT DOCUMENTS

| | | |
|---|---|---|
| DE | 10065020 A1 | 3/2002 |
| DE | 102004003577 A1 | 9/2005 |
| DE | 102005046538 A1 | 5/2007 |
| EP | 1288562 A1 | 3/2003 |
| EP | 1715244 B1 | 10/2006 |
| EP | 1881263 A1 | 1/2008 |
| EP | 1881265 A1 | 1/2008 |
| FR | 1334217 A | 8/1963 |
| FR | 2819040 A1 | 7/2002 |

\* cited by examiner

*Primary Examiner* — Julie Shallenberger
(74) *Attorney, Agent, or Firm* — Jacox, Meckstroth & Jenkins

(57) ABSTRACT

An optical system for a motor vehicle, the optical system performing at least one main optical function and including in particular a diffusion screen, at least one light source of the LED type, each LED of the optical system producing a set of rays of light to be propagated in the diffusion screen wherein the screen is in the form of a curved sheet, with an upper lateral flange and a lower lateral flange which meet at a periphery which has in particular a rear face and a front edge and the principal function is performed essentially via an output face constituted by the front edge of the diffusion screen.

15 Claims, 3 Drawing Sheets

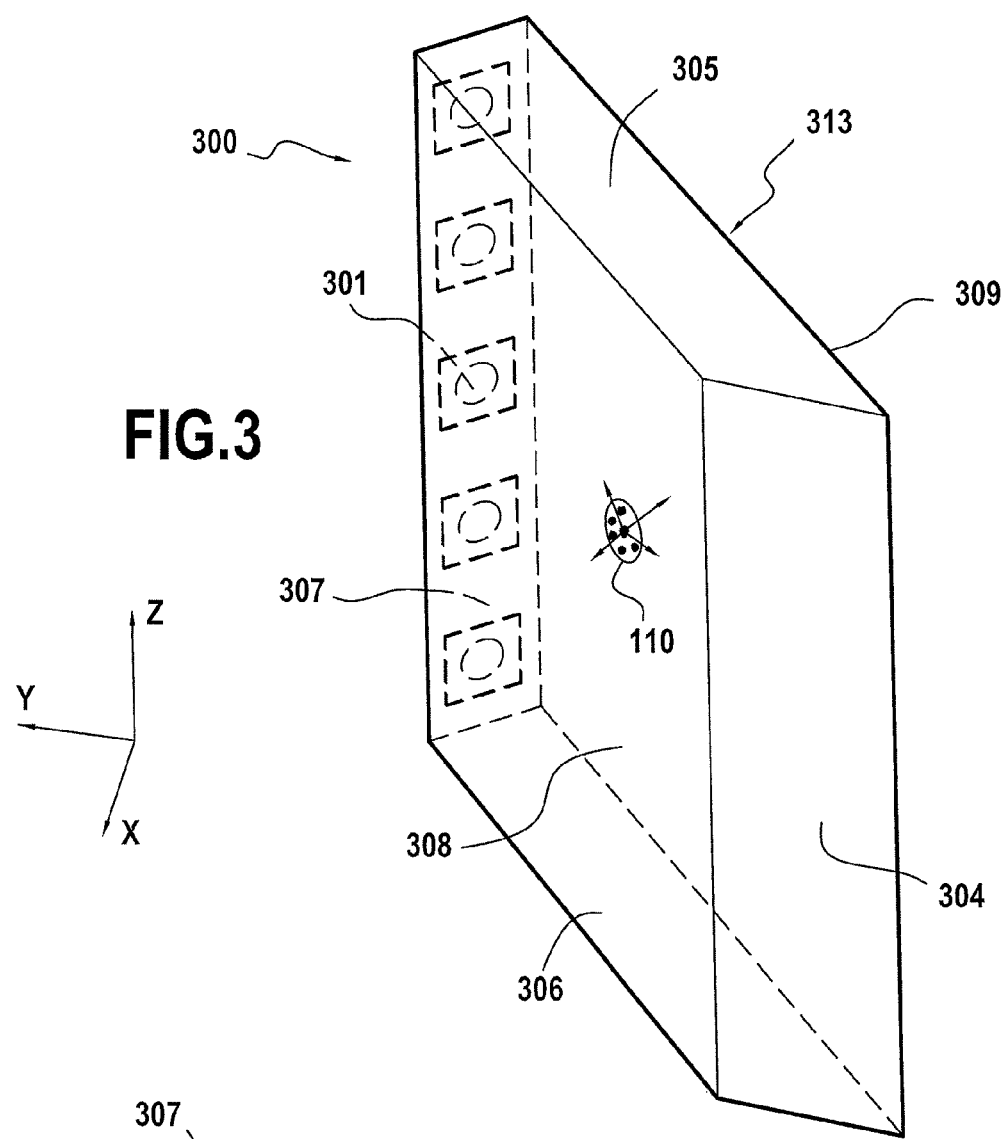
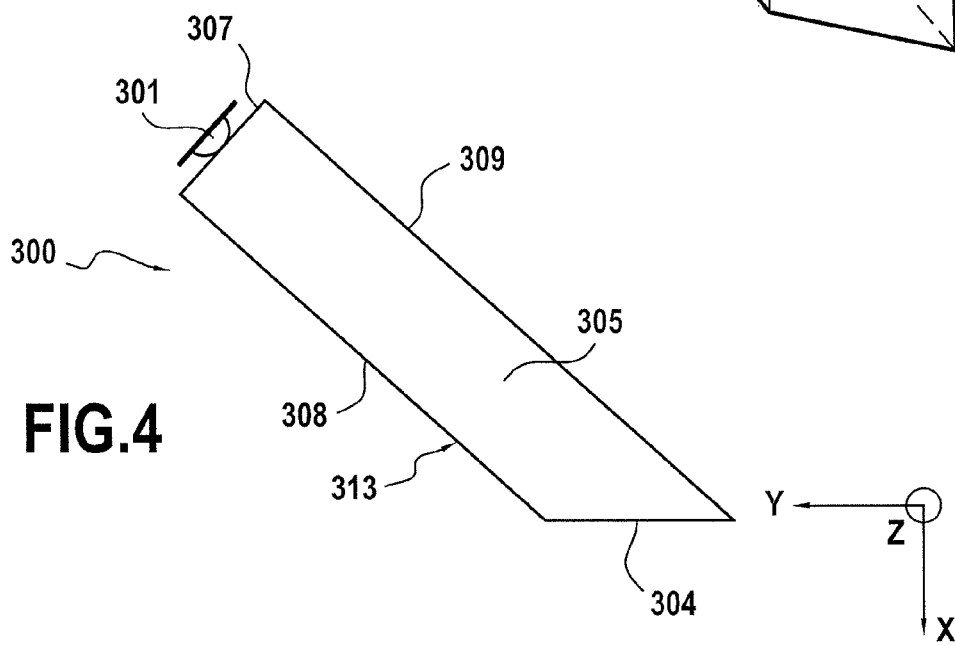

OPTICAL SYSTEM WITH MAIN FUNCTION FOR MOTOR VEHICLE

CROSS-REFERENCE TO RELATED APPLICATIONS

This application claims priority to French Application No. 0801168 filed Mar. 3, 2008, which application is incorporated herein by reference and made a part hereof.

BACKGROUND OF THE INVENTION

1. Field of the Invention

The subject of the present invention is an optical system for a motor vehicle having a stylized main function, performed by means of at least one light source, in particular of the light-emitting diode type. The essential purpose of the invention is to propose, on the basis of a limited number of light sources, preferably LEDs, an optical system performing a main optical function by means of a transmission screen, the visible surface of which is sufficient to satisfy the regulatory requirements of the optical function under consideration. The term optical system refers to an element forming part or all of a headlamp device, exhibiting at least one light source and means of performing at least one optical function; optical function refers to the production of a regulatory light beam for the production of certain of the lights mentioned below.

The domain of the invention is, in general, that of the lights or lamps of motor vehicles. In this domain, various types of lights are known, among which are included essentially:
 tail lights, or position lights, of low intensity and range;
 low beam lights, or dipped lights, of higher intensity and with a range on the road in the vicinity of 70 meters;
 long-range high-beam headlamps, and additional lights of the long-range type, with a zone of vision on the road in the vicinity of 200 meters;
 advanced headlamps, known as dual-mode, which combine the functions of dipped headlights and full beam headlights by incorporating a detachable mask;
 fog lamps;
 signalling lights, in particular front and rear turn indicators, reverse lights, or tail lights;
 signalling devices of the position light type for daytime use, known as DRL (Daytime Running Light) devices.

The domain of application of the invention is essentially that relating to brake lights, turn indicators, position lights or DRL.

2. Description of the Related Art

For all of these headlamps and lights, the light sources traditionally used are of the halogen lamp type, or discharge lamps. But for some years now, automotive equipment suppliers have proposed the utilization of light-emitting diodes, or LEDs; this utilization concerns, for example, indicator lights or rear lights.

Light-emitting diodes present a certain number of advantages:
 first of all, for a long time, it has been known that this type of diode does not send out beams omnidirectionally, but radiates in a half space opposite a substrate which supports the P-N junction of the diode considered; thus, by using radiation more directionally than halogen or discharge lamps, from the state of the art, the quantity of energy wasted is less than with discharge or halogen lamps;
 further, these diodes have recently been improved in terms of the intensity of radiated power. Moreover, manufactured diodes have for a long time emitted radiation in red, but now also in white, which expands the field of their potential uses. The amount of heat which they give off is relatively limited, and a certain number of constraints, in connection with the dissipation of heat in state of the art headlamp devices, no longer apply; the problem of heat dissipation, however, remains important for power LEDs;
 finally, diodes consume less energy than discharge or halogen lamps, even at the same radiation intensity; they take up little space, and their particular shape offers new possibilities for the creation and the configuration of the complex surfaces associated with them, in particular by arranging them on electronic supports of the flexboard type.

The use of LEDs has become more and more widespread, in particular to respond to the aesthetic criteria desired by vehicle manufacturers. This use especially enables the production of headlamps presenting original volumes, for example by arranging LEDs three-dimensionally, i.e. on a non-plane support substrate, within the headlamp devices in question, or again, by using light guide type elements.

Furthermore, an optical system has recently been proposed in which different LEDs were specifically used to create a curtain of light by means of a screen inside the optical system, in which the light produced by the diode or diodes is propagated, the optical system also performing an optical function, known as the main optical function by comparison with any other optical function which may be performed by the optical system in question, in the form of a light beam generated by a third light source. In this optical system, it is necessary to make use of a plurality of light sources, as the LEDs used are not involved in the performance of the main optical function. The cost of such an optical system is therefore high, due to the large number of light sources it requires, and, for the same reasons, it takes up a lot of space.

The term curtain of light refers to a surface illuminated by part of an optical system, the illumination being produced by light beams circulating inside a volume, in particular delimited by the illuminated surface, the illumination having until then a purely decorative function, not executing, or not contributing to—or only insignificantly—the performance of the main optical function. Advantageously, the illumination produced is as continuous as possible, with no pixelization effect.

SUMMARY OF THE INVENTION

The object of the invention is to propose a solution to the problems and disadvantages which have just been explained. In one aspect of the invention, an optical system is proposed in which the number of light sources involved is limited, preferably by limiting the utilization of LEDs to the performance of a main function. Moreover, in another aspect of the invention, a screen is disposed in which are diffused the signals, or beams, of light produced by the light sources, in particular LEDs, in such a way that, due to the positioning of the diffusion screen, it is essentially an output edge of the screen which contributes to the performance of the desired main function; the visible illuminated surface is increased by the shape of the screen considered, a lateral flange of the screen diffusing light so as to contribute to the performance of the desired main function. Advantageously, the positioning of the diffusion screen is such that it contributes to the performance of a second optical function of the lateral marking type, this function being known in English as a "side marker".

The invention thus essentially concerns an optical system for a motor vehicle, the optical system performing at least one main optical function and comprising in particular:

a diffusion screen, also known as a light guide;
at least one light source, notably of the LED type, each light source of the optical system producing a set of rays of light which are propagated in the diffusion screen.

In one aspect, the invention comprises a system in which:
the screen is in the form of a sheet, notably curved or substantially plane, with an upper lateral flange and a lower lateral flange which are joined by means of a periphery having a rear face, a front edge, the periphery can also comprise a first lateral face and a second lateral face;
the main function is performed essentially via an output face constituted by the front edge of the diffusion screen; and
at least one part of the upper lateral flange diffuses a light beam contributing notably to the performance of the main function and/or performing a complementary optical function.

The optical system according to the invention may comprise, in addition to the main characteristics which have just been mentioned in the preceding paragraph, one or more supplementary characteristics including the following:
the front edge has a thickness of between 3 and 5 millimeters, notably 4 millimeters;
a first part of the upper lateral flange diffuses a light beam contributing to the performance of the main function;
at least one part of the upper lateral flange diffuses a light beam and is oriented in such a way as to increase the visible illuminated surface of the optical system in the direction of emission of the main function;
the main optical function performed is of the brake light type, or of the position light type, or of the turn indicator type;
a second part of the upper lateral flange diffuses a light beam performing a complementary optical function;
the complementary optical function performed is of the lateral marking type;
the upper lateral flange diffuses a light beam via a plurality of micro-roughnesses suitable to disperse to the exterior of the diffusion screen some of the rays of light propagating in the diffusion screen, these micro-roughnesses forming notably a plurality (110) of minidiscs;
the micro-roughnesses form minidiscs having a diameter substantially between two tenths of a millimeter and six tenths of a millimeter, typically four tenths of a millimeter;
the light sources, in particular LEDs, are arranged opposite the rear face of the diffusion screen;
it comprises at least one lateral face, the light sources, in particular the LEDs, being arranged opposite at least one of the lateral faces of the diffusion screen;
the light sources, in particular LEDs, are arranged opposite a single lateral face of the diffusion screen;
the rear face of the periphery comprises a plurality of reflecting prisms suitable to direct the light beams produced by the light sources, in particular LEDs, to the front edge of the diffusion screen.

The supplementary characteristics are associated, according to all possible combinations and to the extent that these supplementary characteristics are not mutually exclusive, in different embodiments of the subject matter of the invention.

The present invention also relates to a headlamp or to a signalling light for a motor vehicle equipped with an optical system according to the invention, with its main characteristics, and possibly one or more supplementary characteristics which have just been mentioned.

BRIEF DESCRIPTION OF THE ACCOMPANYING DRAWINGS

The invention and its different applications will be better understood by reading the following description and examining the accompanying figures.

These figures are shown only by way of indication and do not in any way limit the invention. The figures show:

FIG. 3 is a perspective view of a third embodiment of an optical system according to the invention;

FIG. 4 is a top view of the third embodiment shown in FIG. 3.

DETAILED DESCRIPTION OF THE PREFERRED EMBODIMENTS

The different elements appearing in several figures, unless otherwise stated, have retained the same reference numbers.

Figure 1A:
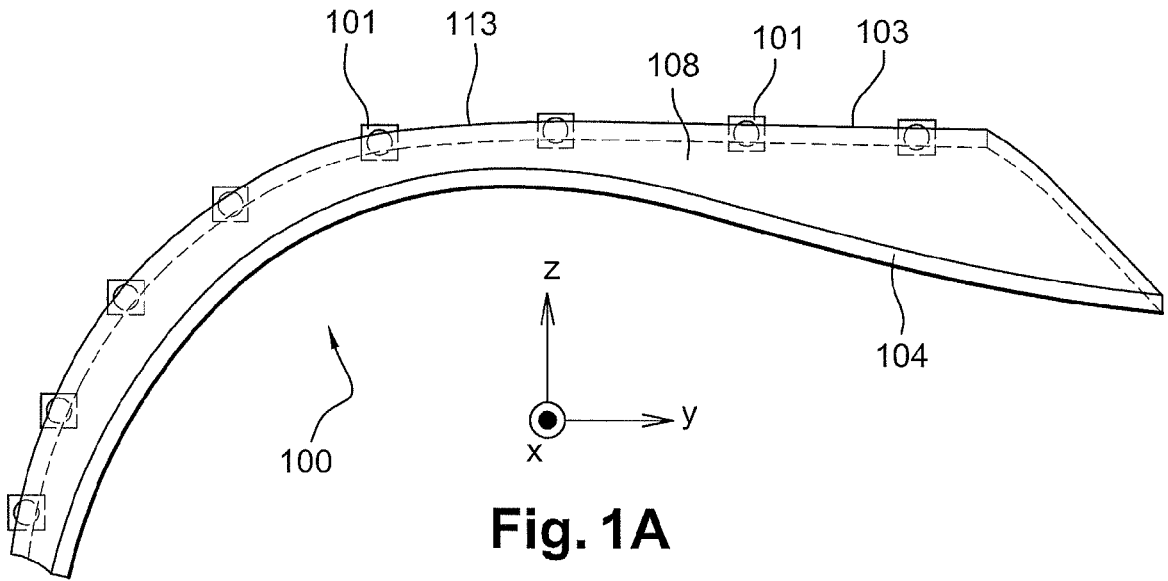
FIGS. 1A, 1B and 1C are different perspectival views of a first embodiment of an optical system according to the invention.
Figure 1B:
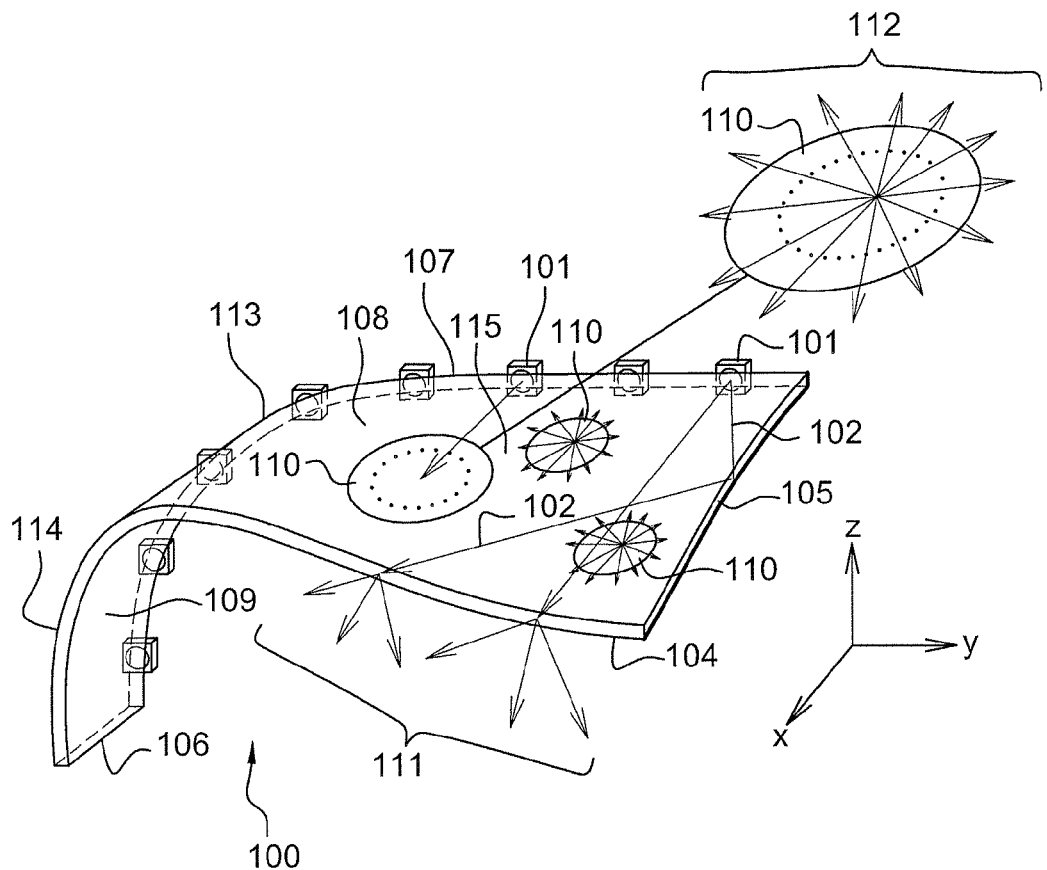
Figure 1C:
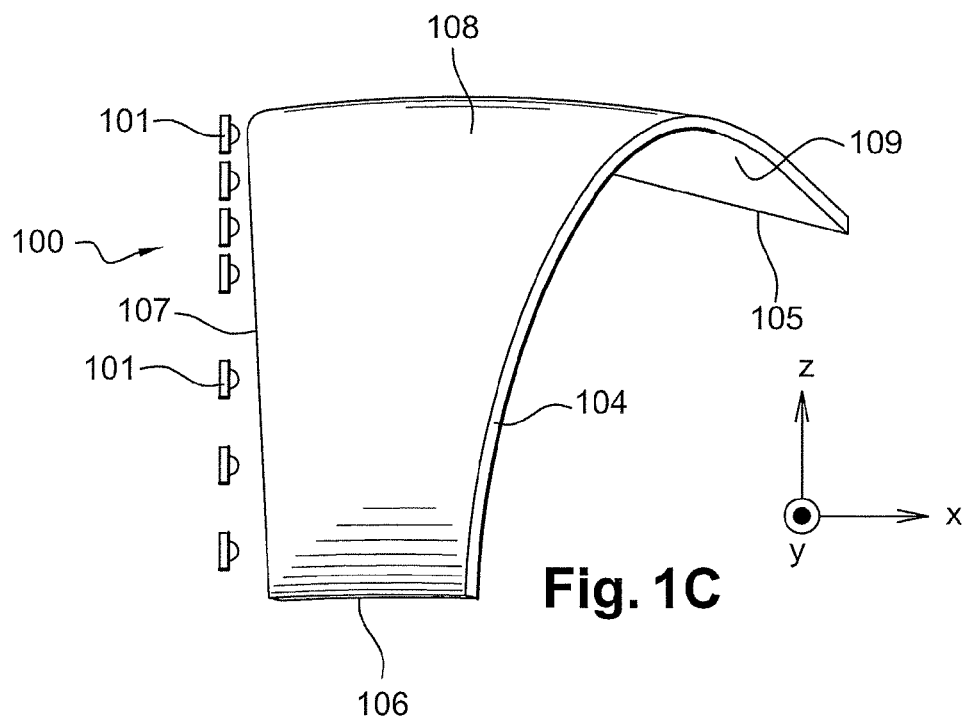

FIGS. 1A, 1B and 1C show a first embodiment of an optical system according to the invention in, respectively, a first position, a second position and a third position. A three-dimensional orthogonal marker is shown in these figures, with an axis of abscissas X corresponding to the axis of displacement of the reversing vehicle, and a normal Z axis corresponding to the vertical.

In these figures, the optical system 100 according to the invention consists of a diffusion screen 113 and of a plurality of LEDs 101 producing the rays of light 102 which are intended to be propagated in the diffusion screen 113. The screen 113 is made from a transparent plastic material, in particular of the type PMMA (for PolyMethyl MethAcrylate) or PC (for superfluid high transmission PolyCarbonate).

Advantageously, the LEDs 101 is all arranged on a single plane substrate, not shown, which holds them in position and controls them.

The diffusion screen 113 takes the form of a curved sheet. A term of this type refers to the fact that the screen 113, if it were flattened, would constitute an element of homogeneous thickness, of approximately four millimeters, said thickness being small in size in relation to the other dimensions of the flattened shape; which is of the quadrilateral type in the example shown.

The diffusion screen 113 is thus characterized by an upper lateral flange 108, a lower lateral flange 109, these two parts being linked by a periphery 103, having a front edge—i.e. a linear face—104, a first lateral face 105, a second lateral face 106 and a rear face 107. The front edge 104 is the face of the optical system which is directly visible to an observer positioned at the rear of the vehicle equipped with the optical system considered. In the examples shown, the diffusion screen is curved such that an observer positioned at the rear of the vehicle sees at least part of the upper lateral flange 108. Such a characteristic is expressed by the fact that at least one of the lateral faces 105 or 106 of the periphery 103 constitutes a curved, or at least inclined, segment.

In the first example shown, the diodes 101 are arranged opposite the rear face 107, at the level of which the rays of light 102 which they produce enter the diffusion screen 113. The rays of light 102 are thus propagated in the volume defined by the diffusion screen 113, possibly after reflection from the lateral faces 105 and 106, to exit from the diffusion screen 113 at the front edge 104 in the form of a light beam 111, where a main optical function is at least partially performed, for example of the sidelight type.

Advantageously, the upper lateral flange 108 consists of a plurality of minidiscs with a diameter of between 2 and 6 tenths of a millimeter, which make it possible, with the aid of the micro-roughnesses which they exhibit, to diffuse to the exterior of the diffusion screen 113, through a first part 115 of the upper lateral flange 108, some of the rays of light 102 in the form of a light beam 112. The term micro-optic surface is often used to describe such a diffusion surface. In FIG. 1B, the minidiscs are represented by points inside a zone 110 surrounded by a circle, shown enlarged at the top right of the illustration of the diffusion screen 113. In the enlarged illustration, a light beam 112 generated by one of the minidiscs has been represented by a set of arrows. Obviously, most if not all of the minidiscs generate a light beam 112. Two other zones 110 have been shown in diagram form on the diffusion screen 113. The minidiscs may preferably be distributed over the entire lateral flange 108. The light beams 112, corresponding to the light diffused by the minidiscs, contribute to the performance of the main optical function by increasing the visible illuminated surface of the optical system 100. The visible illuminated surface may thus be made larger to a greater or lesser degree by inclining the optical system 100 more or less.

The front edge 104 is rendered homogeneous with the aid of a surface which is either perfectly diffusing to conceal the hot points and to distribute the beams spatially, or covered in optical patterns (equivalent to pseudo-toric surfaces of small dimensions to match the surface) to distribute the beams spatially, or perfectly polished to reveal the hot points corresponding to the position of the origin of the emitters, the LEDs.

Advantageously, part 114 of the upper lateral flange 108 is used to perform a complementary function of the lateral marking type (side marker in English): to this end, provision is made that the part 114 is substantially vertical, and that it projects at least partially beyond the body of the vehicle so as to be visible when the vehicle is viewed from the side.

Figure 2:
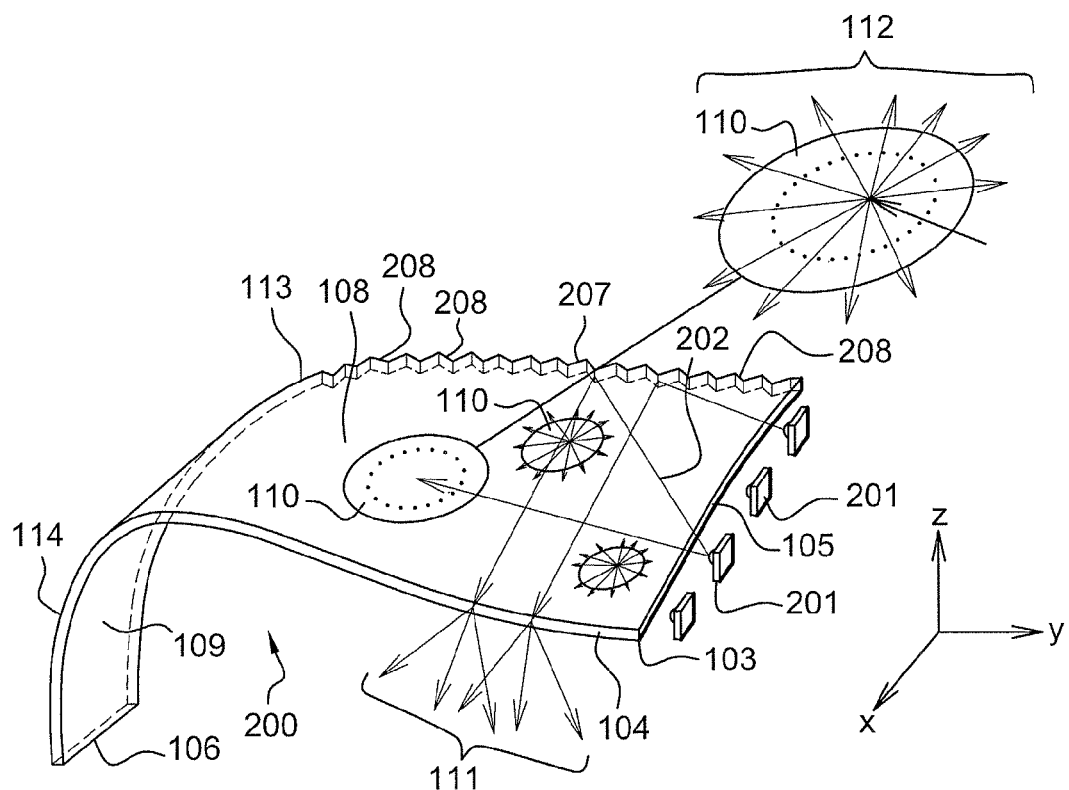
FIG. 2 is a perspective view of a second embodiment of an optical system according to the invention.

FIG. 2 shows a second embodiment 200 of an optical system according to the invention. The second embodiment differs from the first embodiment by the following characteristics:

the LEDs 201, producing light beams 202, are arranged opposite the first lateral face 105, and not opposite the rear face 107;

the rear face 107, which was plane in the first embodiment 100, has been replaced by a rear face 207, consisting of a succession of reflecting prisms 208, which use total reflection to redirect the light beams 202 to the front edge 104, over the entire length necessary to the performance of the main function, as in the first embodiment described.

The other elements which appeared in the first embodiment are still present, and fulfill the same function.

FIGS. 3 and 4 show a third embodiment 300 of an optical system according to the invention. It differs from the first embodiment in that the diffusion screen 313 is substantially plane, thus in the form of a substantially plane sheet. The lower 309 and upper 308 lateral flanges are substantially plane. Preferably, the rear edge 307 and the lateral edges 305 and 306 are also substantially plane. The output face 304 preferably forms, with the upper lateral flange 308, an angle of over 90 degrees and the diffusion screen 313 is oriented such that:

the output face 304 is substantially perpendicular to the X-axis, this X-axis corresponding to the direction of emission of the light of the main function; and the upper lateral flange forms an acute angle in relation to the transverse Y-axis, the front edge 304 and the lateral flange 308 are directly visible to an observer positioned facing the direction of the X-axis.

In this third embodiment, the orientation thus makes it possible firstly to have part of the main function essentially or mainly performed by the output edge 304 according to the X-axis, i.e. towards the rear of the vehicle when the device is situated in a rear light of the vehicle, and secondly, by means of the light diffused by the upper lateral flange 308, to have an increase in the visible surface according to the X-axis of this main function, and a repeat function along the Y-axis, that is, on the side of the vehicle when the device is situated at the rear of the vehicle.

The other elements, for example the micro-roughnesses which appeared in the first embodiment, are still present in this third embodiment and fulfill the same function.

To explain the present invention, the expression "upper lateral flange" generally refers to the lateral flange which is oriented towards the exterior of the vehicle and thus visible to an observer. In particular, it could be applied to a diffusion screen which, once mounted on the vehicle, would show a visible lateral flange which is vertical, or even inclined towards the ground.

While the forms of apparatus herein described constitutes preferred embodiments of this invention, it is to be understood that the invention is not limited to these precise forms of apparatus, and that changes may be made therein without departing from the scope of the invention which is defined in the appended claims.

What is claimed is:

1. An optical system for a motor vehicle, said optical system performing at least one main optical function particular comprising:

a diffusion screen;

at least one light source, of an LED type, each of said at least one light source of the optical system producing a set of rays of light to be propagated in the diffusion screen;

wherein said diffusion screen is in the form of a sheet with an upper lateral flange surface and a lower lateral flange surface which are joined by a periphery having a rear face and a front edge, wherein the diffusion screen is curved with a rear facing portion and a side facing portion;

wherein said optical system performs both a main optical function and a complementary optical function said at least one main optical function is performed essentially via diffusively illuminating the rear facing portion of the upper lateral flange and an output face constituted by the front edge of the diffusion screen wherein the rear facing portion and front edge are visible from a rear of the vehicle; and wherein said complementary optical function is performed essentially via the side facing portion of the upper lateral flange that is visible from a side of the vehicle, wherein said at least one main optical function provides a brake, position light, or turn indicator on a rear of the motor vehicle, and said complementary optical function provides a light on a side of the motor vehicle and provides a different optical function than said at least one main optical function.

2. The optical system according to claim 1, wherein the front edge has a thickness of between 3 and 5 millimeters.

3. The optical system according to claim 1, wherein at one least part of said upper lateral flange diffuses a light beam and is oriented in such a way as to increase the visible illuminated surface of the optical system in the direction of emission of said at least one main optical function.

4. The optical system according to claim 1, wherein said upper lateral flange surface diffuses a light beam which performs said complementary optical function type wherein said complementary optical function propagates rays through at least one of said lower lateral flange or upper lateral flange thereby causing light rays to be propagated laterally with respect to an axis of said diffusion screen to provide a side marker light on said side of the motor vehicle.

5. The optical system according to claim 1, wherein said upper lateral flange diffuses a light beam via a plurality of micro-roughnesses suitable to disperse to the exterior of the diffusion screen some of said rays of light to be propagated in said diffusion screen, said plurality of micro-roughnesses forming notably a plurality of minidiscs.

6. An optical system for a motor vehicle, said optical system performing at least one main optical function and comprising;
  a diffusion screen;
  at least one light source, notably of an LED type, each of said at least one light source of the optical system producing a set of rays of light to be propagated in the diffusion screen;
  wherein said diffusion screen is in the form of a sheet, curved or substantially planar, with an upper lateral flange and a lower lateral flange which are joined by a periphery having a rear face and a front edge;
  said at least one main optical function is performed via an output face constituted by the front edge of the diffusion screen; and
  at least one part of said upper lateral flange diffuses a light beam that contributes to a performance of at least one of said at least one main optical function or a complementary optical function;
  wherein said upper lateral flange diffuses a light beam via a plurality of micro-roughnesses suitable to disperse to the exterior of the diffusion screen some of said rays of light to be propagated in said diffusion screen, said plurality of micro-roughnesses forming notably a plurality of minidiscs;
  wherein said plurality of micro-roughnesses form minidiscs with a diameter of between two tenths of a millimeter and six tenths of a millimeter, typically four tenths of a millimeter.

7. The optical system according to claim 1, wherein said at least one light source is arranged opposite the rear face of the diffusion screen.

8. A headlamp or signal lamp for a motor vehicle, wherein said headlamp or signal lamp is fitted with the optical system according to claim 1.

9. The optical system according to claim 2, wherein at one least part of said upper lateral flange diffuses a light beam and is oriented in such a way as to increase the visible illuminated surface of the optical system in the direction of emission of said at least one main optical function.

10. The optical system according to claim 2, wherein said upper lateral flange diffuses a light beam which performs said complementary optical function wherein said complementary optical function is of a lateral marking type.

11. The optical system according to claim 2, wherein said upper lateral flange diffuses a light beam via a plurality of micro-roughnesses suitable to disperse to the exterior of the diffusion screen some of said rays of light to be propagated in said diffusion screen, said plurality of micro-roughnesses forming notably a plurality of minidiscs.

12. The optical system according to claim 3, wherein said upper lateral flange diffuses a light beam via a plurality of micro-roughnesses suitable to disperse to the exterior of the diffusion screen some of said rays of light to be propagated in said diffusion screen, said plurality of micro-roughnesses forming notably a plurality of minidiscs.

13. The optical system according to claim 3, wherein said at least one light source is arranged opposite the rear face of the diffusion screen.

14. The optical system according to claim 3, wherein said optical system includes at least one lateral face, said at least one light source being arranged opposite said at least one lateral face of the diffusion screen.

15. The optical system according to claim 2, wherein said thickness is 4 millimeters.

* * * * *